United States Patent [19]

Frangos

[11] 3,860,130

[45] Jan. 14, 1975

[54] STORAGE AND RETRIEVAL SYSTEM
[76] Inventor: John W. Frangos, 2 Brembal Hill Dr., Beverly, Mass. 01915
[22] Filed: Mar. 29, 1973
[21] Appl. No.: 345,868

[52] U.S. Cl............................................ 214/16.1 B
[51] Int. Cl............................................... E04h 6/06
[58] Field of Search...214/16.1 B, 16.1 CD, 16.1 EC

[56] References Cited
UNITED STATES PATENTS

| 1,782,410 | 11/1930 | Cook | 214/16.1 B |
|---|---|---|---|
| 2,600,869 | 6/1952 | Harkness et al. | 214/16.1 B |
| 2,617,700 | 11/1952 | Christie et al. | 214/16.1 B |
| 3,554,389 | 1/1971 | Bright | 214/16.1 CD |

FOREIGN PATENTS OR APPLICATIONS

| 1,290,911 | 1/1962 | France | 214/16.1 B |
|---|---|---|---|
| 689,075 | 3/1953 | Great Britain | 214/16.1 CD |
| 584,418 | 10/1958 | Italy | 214/16.1 CD |

Primary Examiner—Robert J. Spar
Assistant Examiner—R. B. Johnson
Attorney, Agent, or Firm—Morse, Altman, Oates & Bello

[57] ABSTRACT

A storage and retrieval system is provided for general storage applications such as warehousing, automatic parking garages, containerized cargo, commercial and office storage, and similar applications. In the preferred embodiment of the invention, a box-like structure of rectangular outline forms a guide way for a plurality of stacked, movable storage units to be circulated vertically and horizontally. The structure defines a rectangular volume dimensioned to accommodate an even number of movable storage units. The actual number of storage units employed normally is one less than the capacity of the structure to allow free room for the units to be circulated. Each unit is provided with integrated rollers which ride upon and are guided by adjacent units and by rollers or wheels mounted to the structure. Power driven transfer mechanisms are provided for shifting the storage units vertically and horizontally within the structure.

In a modification of the system, a horizontal support provides a path for circulating multiple rows of load-carrying movable storage units to and from a vertically movable elevator. Drive means are provided for horizontally shifting the rows and transferring units from one row to another.

2 Claims, 10 Drawing Figures

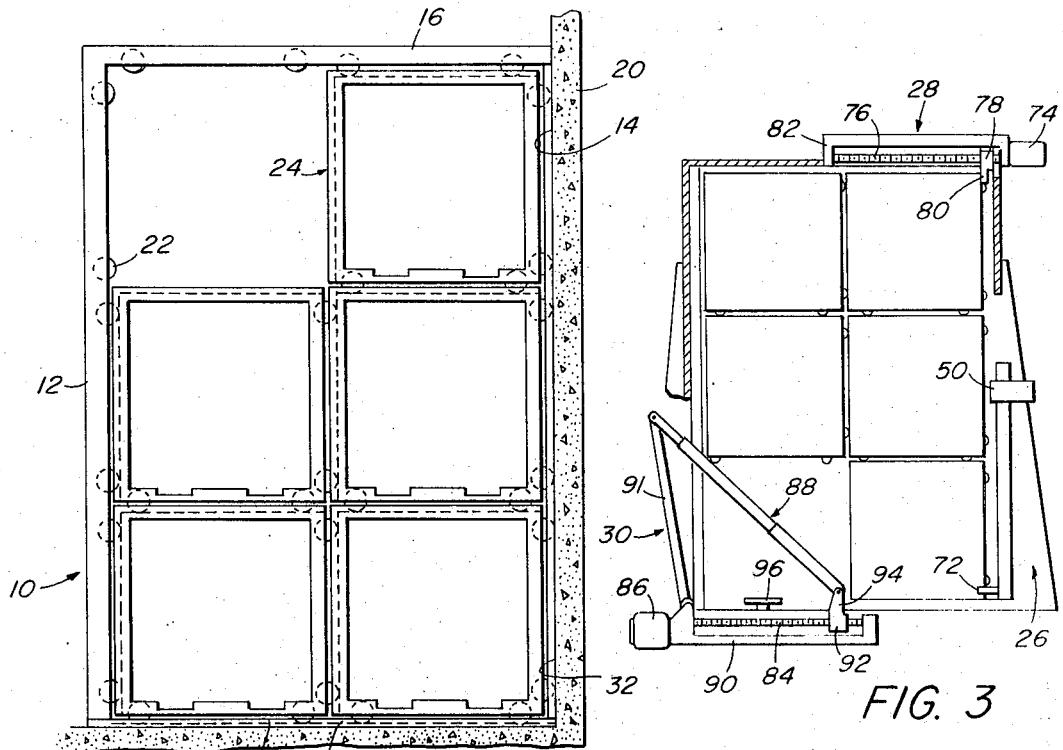
FIG. 1
FIG. 3
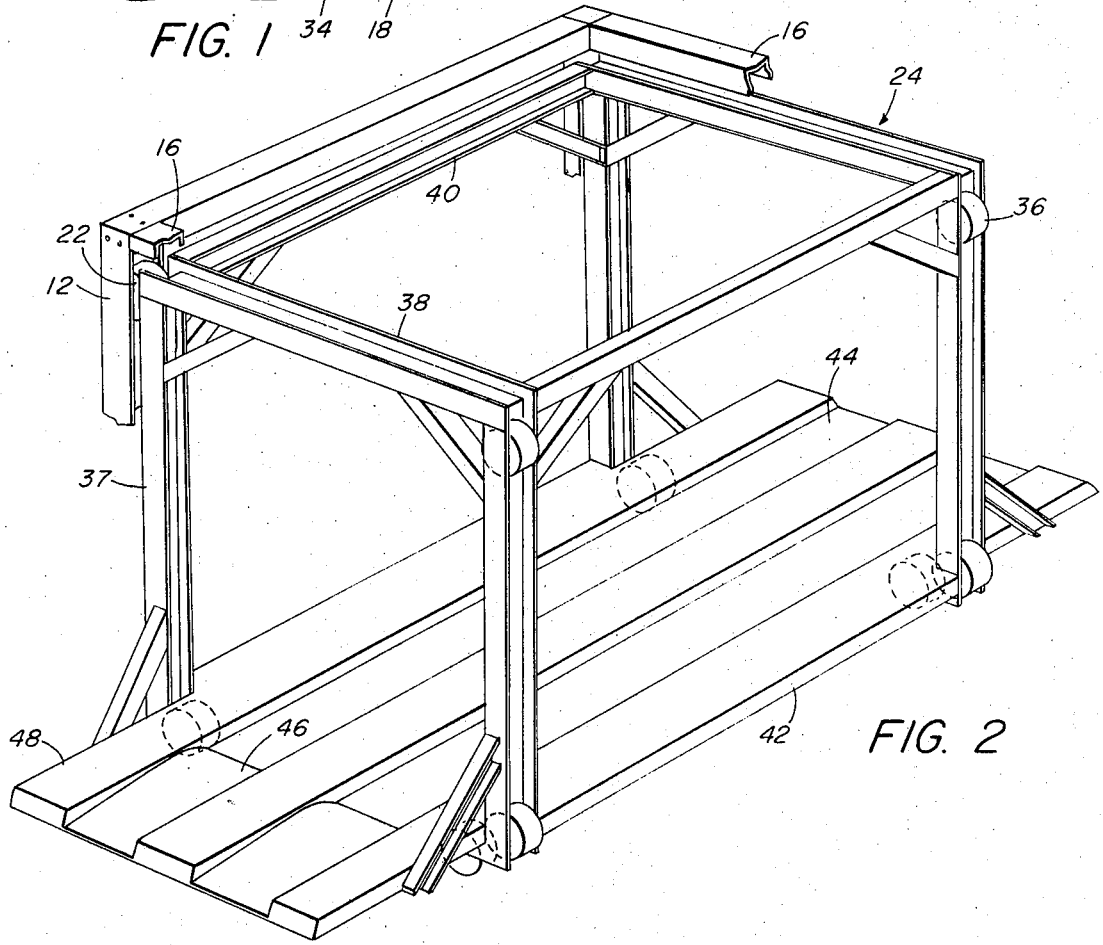
FIG. 2

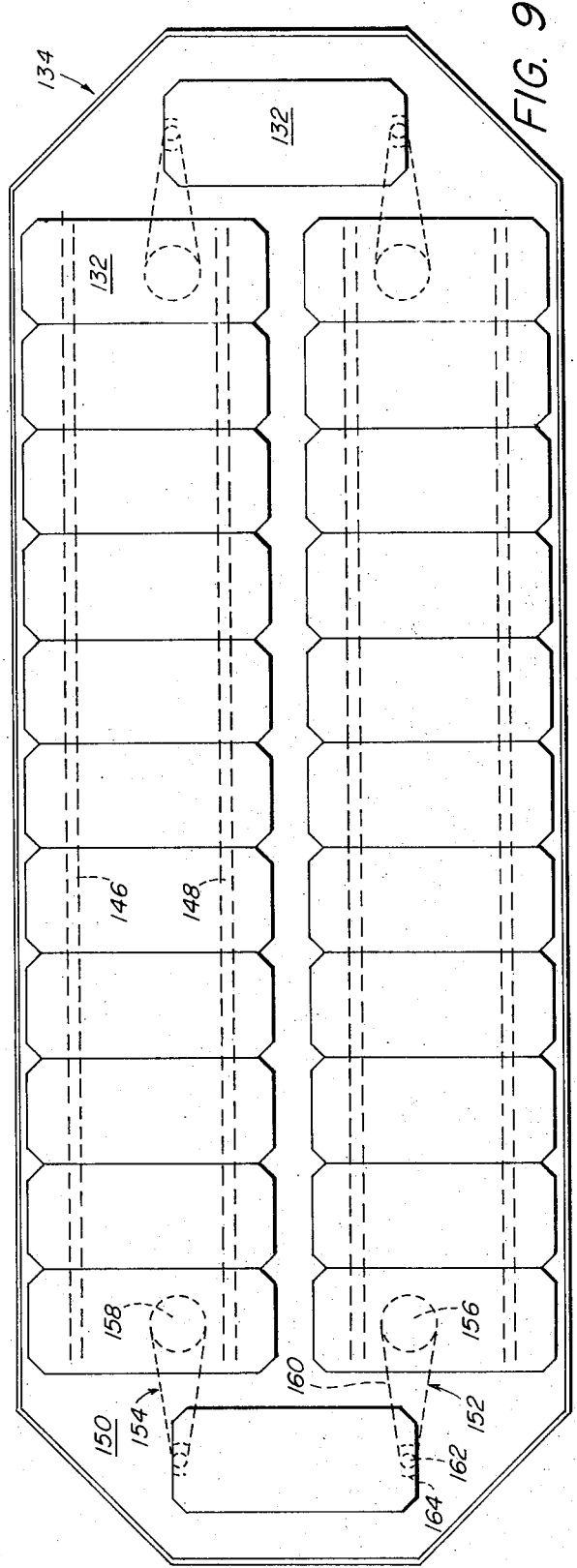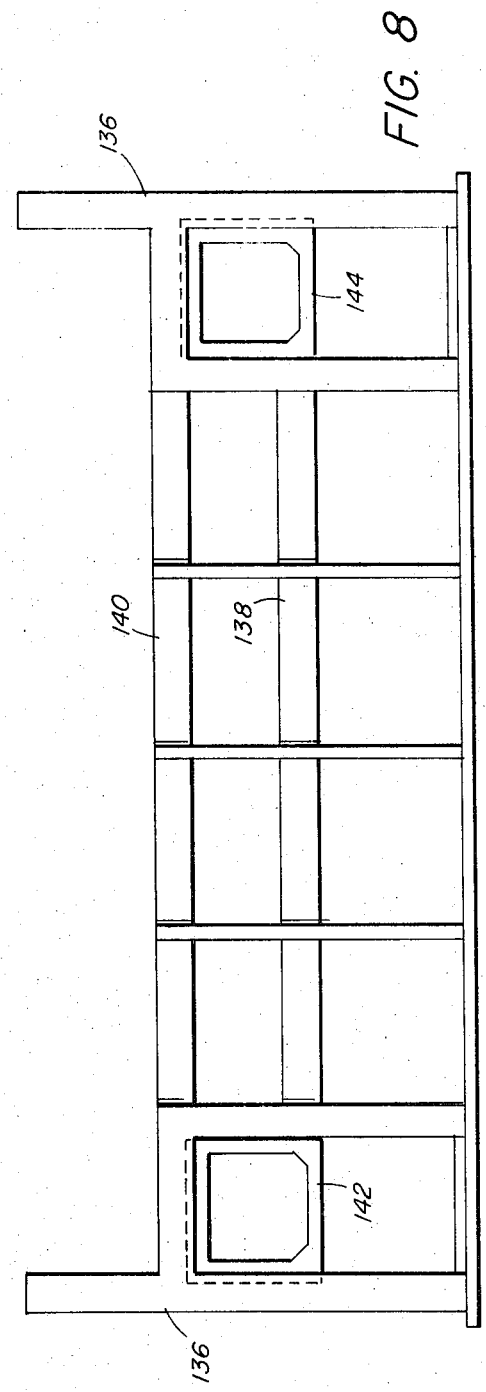

STORAGE AND RETRIEVAL SYSTEM

BACKGROUND OF THE INVENTION

1. Field of the Invention

This invention relates generally to storage systems and more particularly is directed towards an improved low cost, high density modular storage and retrieval system employing a plurality of movable storage units within a generally rectangular volume.

2. Description of the Prior Art

Automated and semi-automated storage systems are employed in various fields such as warehousing, parking garages and the like. Systems currently in use often employ movable pallets or the like transferred from a storage position to a delivery station as by a conveyor or fork-lift, for example. Some of these systems have utilized hoisting mechanisms such as elevating conveyors in which the goods are stored on the conveyor itself. Numerous other systems are also in use which combine various features of other systems. However, one of the main drawbacks encountered in automatic and semi-automatic storage systems relates to the cost of the system and the storage density achieved for a given volume of storage and access space. Systems currently available generally are rather complex mechanisms which add to the cost of an installation and adversely affect the reliability of such systems. Furthermore, systems currently available are not readily adapted for use where there is a need for temporary storage facilities of variable capacity. Furthermore, most storage systems take the form of permanent installations and are not readily movable from one site to another.

Accordingly, it is an object of the present invention to provide improvements in automatic and semi-automatic storage systems. Another object of this invention is to provide a storage system of relatively simple construction and operation characterized by a high storage density for a given volume. Still another object of this invention is to provide a modular storage system particularly adaptable for low cost, temporary storage requirements.

SUMMARY OF THE INVENTION

This invention features a storage system comprising an upright boxed structure defining an open rectangular enclosure therein for the storage and movement of a group of movable storage units and a plurality of box-like storage units equal in number to one less than the capacity of the structure. Each unit is provided with cooperating rollers for supporting and guiding engagement with the structure and with adjacent movable storage units. Power-driven transfer means are provided for raising, lowering and shifting the units within the structure along vertical and horizontal paths. In a modification of the invention a plurality of movable storage units are disposed on a horizontal floor to permit circulation of the units about a rectangular path and an elevator for selectively transferring storage units from one level to another.

BRIEF DESCRIPTION OF THE DRAWINGS

FIG. 1 is a view in front elevation of a storage system made according to the invention, FIG. 2 is a view in perspective of an individual movable storage unit employed in the FIG. 1 system, FIG. 3 is a front elevational view, partly in section and somewhat schematic, showing the transfer mechanism of the FIG. 1 system, FIG. 8 is a view in front elevation showing another modification of the invention, FIG. 9 is a top plan view thereof, and, FIG. 10 is a front elevation showing a further modification.

DETAILED DESCRIPTION OF THE PREFERRED EMBODIMENTS

Figure 7:
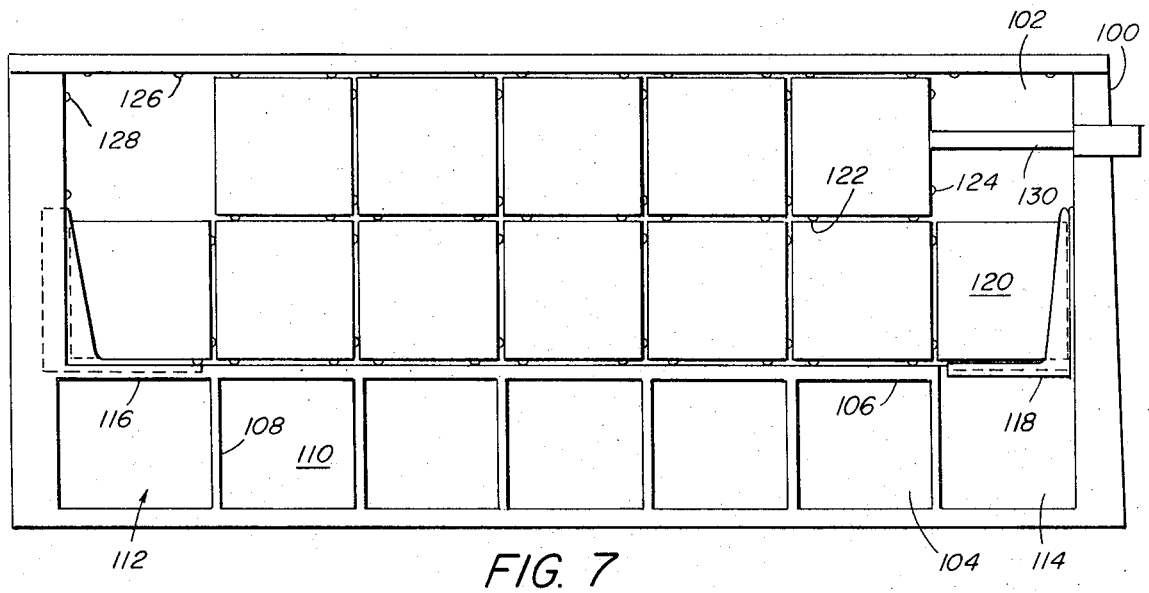
FIG. 7 is a view similar to FIG. 1 but showing a modification thereof.

Referring now to the drawings and to FIGS. 1, 2 and 3 in particular, there is illustrated a storage system made according to the invention and useful for a variety of storage applications such as warehousing, parking garages and similar uses where low cost, high density storage is required, yet providing rapid storage and retrieval. The system of FIG. 1 is generally organized about a rectilinear structure 10 comprised of upright frame members 12 and 14 located at the front and rear corners of the structure, and upper and lower horizontal frame members 16 and 18, respectively, located at the front and rear of the structure and rigidly fastened to the upright members 12 and 14 to form an openwork rectangular frame. The framework 10 may be free-standing and set upright on any flat, cleared, firm ground or it may be installed on a more or less permanent basis as by assembly within a building and secured to a wall 20, as suggested in FIG. 1. In any event, the frame 10 thus is in the form of a box-like structure which is relatively light in weight and may be fabricated from a relatively small number of readily assembled parts to permit modular units to be conveniently transported and assembled at a given site either on a permanent or temporary basis.

As best shown in FIG. 1, the frame 10 is provided with a plurality of spaced rollers 22 mounted for rotation about horizontal axes to the inner faces of both front and rear upright frame members 12 and the upper horizontal frame members 16, both front and rear. Preferably, the rollers are disposed in pairs spaced by distances substantially corresponding with the side wall dimensions of a single movable storage unit 24 located within the structure 10.

The structure 10 is also provided with power-driven transfer mechanisms including a vertical hoist generally indicated by reference character 26, an upper horizontal shifting mechanism 28 and a combination lowering and shifting mechanism 30. The several transfer mechanisms will be described more fully below. The upright frame members 14 and the lower horizontal frame members 18 are formed with channels 32 and 34, respectively, providing a guideway for cooperating rollers 36 mounted for rotation to the right-hand vertical sides and horizontal bottom walls of each movable storage unit 24.

As best shown in FIG. 2, each movable storage unit 24 is a box-like assembly comprised of four rigidly connected upright members 37, a pair of horizontal frame members 38, a pair of side frame members 40 and a bottom support wall 42. The frame members preferably are of a strong, rigid material such as structural steel or the like and, if the system is to be applied as a parking garage for automobiles, the bottom support wall 42 may be formed with parallel guide recesses 44 extending longitudinally of the floor and preferably being formed with transverse rounded shoulder stops 46 to inhibit forward movement of a vehicle stored thereon. In addition, the floor 42 may be provided with an overhang 48 at either end thereof to provide an integral ramp for movement of a vehicle on and off of the platform.

In the embodiment of FIGS. 1 and 3, the storage system is designed to function with five movable storage units and for an installation of this size the frame 10 is fabricated to have a capacity of six movable storage units so that there will always exist a single void corresponding in volume to the size of one storage unit. This void provides the necessary space required for shifting or circulating the storage units within the structure 10. In the illustrated embodiment the storage units are arranged in two vertical columns three units high in the right-hand column and two units high in the left-hand column. A selected unit may be shifted up, down and sideways to any position within the structure by circulating the units within the frame. The circulation involves shifting the top most unit from one column to another and then sequentially raising and lowering the units in each column.

As the storage units are circulated within the structure, the frame rollers 22 support and guide the storage units as they are shifted along the top of the two columns and as they are moved along the bottom of the two columns and vertically along the right-hand column by means of the rollers 36 mounted to the units themselves. These rollers are adapted to engage and move along the channels 32 and 34 in the frame members 14 and 18. In addition, the rollers 36 cooperate with adjacent storage units insofar as the rollers 36 for the units in the left-hand column ride against channels 50 formed on the outer sides of the upright members of the storage unit in the right-hand column. Similarly, the lowermost rollers along the bottom of each unit ride in channels 52 formed horizontally across the frame members 38 of the adjacent storage unit directly below those stacked above. This arrangement eliminates complex and interfering guideways, greatly simplifies the overall structure and permits quick and easy assembly of modular units of any selected capacity. While the illustrated system shows two columns of movable units, obviously this could be increased or decreased both in height and width allowing an increase or decrease in the number of movable storage units within a given structure. The construction also allows for interchange of storage units.

Figure 6:
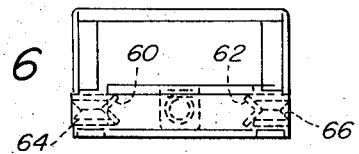
FIG. 6 is a top plan view thereof.
Figure 4:
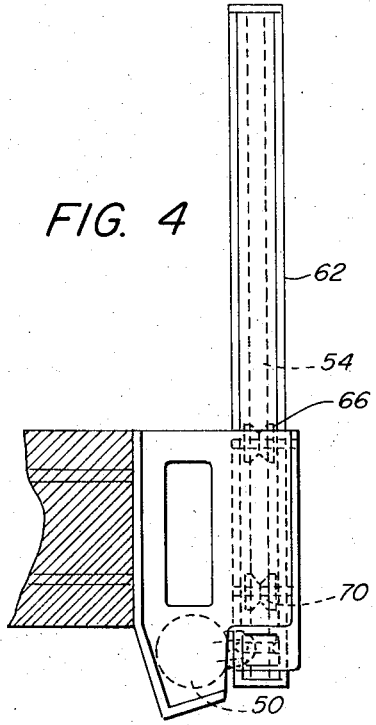
FIG. 4 is a detailed side elevation of the vertical lift mechanism employed in the FIG. 1 system.
Figure 5:
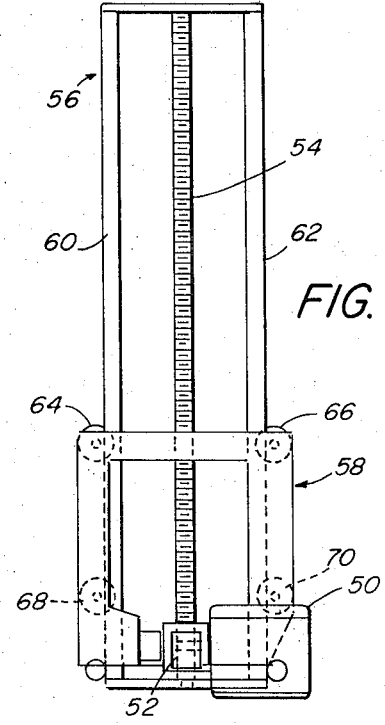
FIG. 5 is a front view thereof.

The storage unit transfer mechanism will now be described in detail. The hoisting mechanism generally indicated by reference character 26 in FIG. 3 and shown in detail in FIGS. 4, 5 and 6 includes a reversible motor 50 fixed to the side frame of the structure 10 and drivingly engaged to a nut 52 threaded to a lead screw 54. The lead screw 54 is mounted to a rectangular screw frame 56 adapted to reciprocate within a fixed guideway 58 to which the motor 50 is mounted. The screw frame 56 includes a pair of parallel track members 60 and 62 of elongated right angle stock mounted to engage V-grooved guide rolls 64, 66, 68 and 70 mounted to the guideway 58.

The screw frame 56 carries a pawl or latch 72 at its lower end adapted to engage the bottom edge of a storage unit 24 for hoisting the storage unit. The latch 72 may be hinged and spring-loaded for movement through a 90° arc for folding the same upwardly in a retracted position against the screw frame when the screw frame, after it has raised the storage unit to the desired level, is making a return stroke. Alternatively, the latch may be designed to retract in and out as by a solenoid and thereby engage a cooperating socket formed in the lower corner of a storage unit.

The stroke of the screw frame 56 should be sufficient to raise a storage unit from the bottom of the stack as in FIG. 3 to a height at the top of the stack and should have sufficient power and structural strength to raise whatever number of storage units are stacked in a particular column. In the illustrated embodiment the load would be two storage units assuming the uppermost position of the right-hand stack is vacant.

The transfer mechanism 28 on the top of the frame is somewhat similar to the hoist mechanism 26 and includes a reversible motor 74 drivingly connected to a lead screw 76 along which moves a follower nut 78 having an integral latch or pawl 80 adapted to engage the right-hand upper corner of the uppermost storage unit 24 and shift it to the left to the top of the adjacent stack. A fixed guide frame 82 is mounted to the top of the structure 10 and also supports the motor 74. As before, the latch 80 may be pivoted to fold back against the lead screw during a return stroke of the follower nut 78.

Finally, the transfer mechanism 30 located in the lower left-hand corner of the structure serves the multiple function of transferring the storage unit from a lower left-hand position at the bottom of the left-hand stack of units to the bottom position of the right-hand stack, while at the same time temporarily holding the left-hand stack suspended until the lowermost unit has been shifted entirely to the right and then lowering the left-hand stack. This is achieved by means of a lead screw 84 driven by a reversible motor 86 in cooperation with an articulated telescopic arm 88. The motor 86 and lead screw 84 are mounted to a guide frame 90 extending horizontally along the base of the structure with the lead screw carrying a follower nut 92 having an extended upper portion 94 pivotally engaging the lower end of the telescopic arm 88 and adapted to engage the lower left-hand corner of a storage unit 24 for use in shifting such units from the bottom of the left-hand stack to the bottom of the right-hand stack. The opposite end of the telescopic arm 88 is pivotally supported by an arm 91 the lower end of which is pivoted to the guide frame 90 at a point near the motor 86. The function of the telescopic arm 88 is to engage and hold the lower left-hand corner of the second level storage unit in the left-hand stack of units while the lowermost unit is being shifted to the right by the follower nut 92 and its extension 94. It will be noted in FIG. 3 that the lower left-hand corner of the second level storage unit in the left-hand column bears against the telescopic arm 88 and it will be understood that the lowermost storage unit that is being shifted will help support the left-hand stack by reason of the rollers 36 on the bottom side of the storage unit riding in the channels of the upper horizontal frame members 38 of the lower storage unit. Once the lowermost unit is shifted entirely to the right-hand stack, the motor 86 is reversed and the follower nut 92 makes a return stroke to the left. During the return stroke, the telescopic rod 88 gradually retracts into a substantially vertical position and gradually lowers the left-hand stack as it retracts. Since the telescopic rod 88 will offer little in the way of support as it moves into a vertical position at the last part of its motion, a damper 96 may be provided at the base of the structure 10 below the left-hand stack to cushion the left-hand stack as it reaches the bottom. The damper 96 may be spring-loaded, hydraulic, or pneumatic, for example, as desired. It will be understood that the several motors 50, 74 and 86 will be operated sequentially with suitable limit switches located at either end of the travel of the follower nuts so as to stop and start the motors in the appropriate timed sequence to allow the units to be circulated without interference.

Referring now to FIG. 7 of the drawings there is illustrated a modification of the invention and in this embodiment a rectilinear frame structure 100 is formed with a relatively high upper chamber 102, a relatively low ground level chamber 104 separated by a horizontal platform 106 supported by a plurality of fixed upright members 108 spaced apart to form a plurality of storage bays 110. At either end of the structure 10 there is formed a vertical passage 112 and 114 each accommodating an elevator 116 and 118. The elevators may be operated by various means such as motor-driven chains, hydraulic or pneumatic mechanisms, lead screws, or the like, and are adapted to lift individual storage units 120 to any selected level within the structure. Preferably, each storage unit 120 is similar in construction and function to the storage units 24 of the principal embodiment.

The individual storage units 120 are provided with bottom and side rollers 122 and 124, respectively, to ride on and be guided by cooperating channels formed transversely in the upper walls of the underlying storage units and also formed in the upper surface of the platform 106. The side rollers 124 similarly engage the vertical channels in the left-hand side walls of the adjacent storage unit to provide the same sort of support and guiding arrangement as set forth in the principal embodiment. The framed structure 100 is also provided with upper and side guide rollers 126 and 128, respectively, similar to the rollers 22 of the principal embodiment.

The storage unit 120 in the upper chamber 102 may be shifted transversely in a manner similar to the shifting arrangement of the principal embodiment by means of various types of transfer mechanisms such as a hydraulic ram 130 mounted at the end of each row of storage units in the upper chamber. The units may be raised or lowered to either row by means of the elevators or may be brought to ground level for loading or delivery of whatever is carried on the storage units. Such a system is well adapted for warehousing or automatic parking garages and the lower bays 110 may serve for use in short term storage while the movable storage units may be utilized for longer term storage purposes.

Referring now to FIGS. 8 and 9 of the drawings there is illustrated a further modification of the invention and in this embodiment, a plurality of an individual storage unit 132 are circulated in a horizontal plane rather than a vertical plane as in the principal embodiment. In FIGS. 8 and 9 the reference character 134 indicates a structure comprised of end walls 136 supporting one or more floors 138 and 140 and provided with elevators 142 and 144 one at either end thereof for reciprocation from a ground level position to any floor level. Each floor level is provided with parallel guide tracks 146 and 148 extending in a double row lengthwise of the structure to provide guideways for two rows of storage units 132 movably mounted in adjacent relation thereon. At opposite ends each level there is an open area 150 which provides clearance space for a unit 132 to be shifted from one row to another and also to be shifted onto one of the elevators 116 and 118. The shifting mechanism of the illustrated embodiment includes cooperating pairs of cranks 152 and 154 mounted to each floor level at opposite ends of each row. The cranks 152 and 154 may be operatively connected to one another by a common motor, chain, hydraulic mechanism or the like to operate each pair of cranks together. Each crank is pivoted about a vertical shaft 156 and 158, respectively, and is provided with an extension arm 160 at the end of which is a lug provided with a roller or the like 162 adapted to engage a recess 164 formed at each end of the storage unit. The cranks 152 and 154 are adapted to rotate in unison and in this fashion they are able to line up with one another when first engaging a unit 132 at the end of one row and then swing around parallel to one another as in FIG. 9 for positioning a unit on an elevator or continue to swing around so as to transfer the unit 132 to the adjacent row. The cranks are able to provide sufficient driving force to move all of the units 132 in a row forwards or backwards and thereby achieve circulation. The ground floor as shown in FIG. 8 includes a number of storage bays 166 similar in function to the bays 110 of the FIG. 7 embodiment.

The system disclosed herein may be used in a wide variety of applications including parking garages, warehousing, storage and retrieval of office files, spare parts storage and retrieval, temporary storage and the like. Containers stored in this fashion may be locked and sealed to prevent pilferage and may be numbered serially to insure an orderly and sequential retrieval of stored goods. Containerized storage and shipment reduces handling of goods from point to point and thereby reduces losses from breakage, theft and the like. Since the system incorporates its own transfer mechanism, duplicate moving equipment such as fork lifts, conveyors, etc., are eliminated.

The system readily lends itself to modular construction and is particularly useful for setting up relatively small, lightweight, temporary installations in confined areas for parking garages. Such systems can be easily erected on any flat, firm surface and can even be set up within existing buildings. When installed outside, the framework may be covered with appropriate panelling to enhance its appearance and comply with local zoning or architectural requirements.

Figure 10:
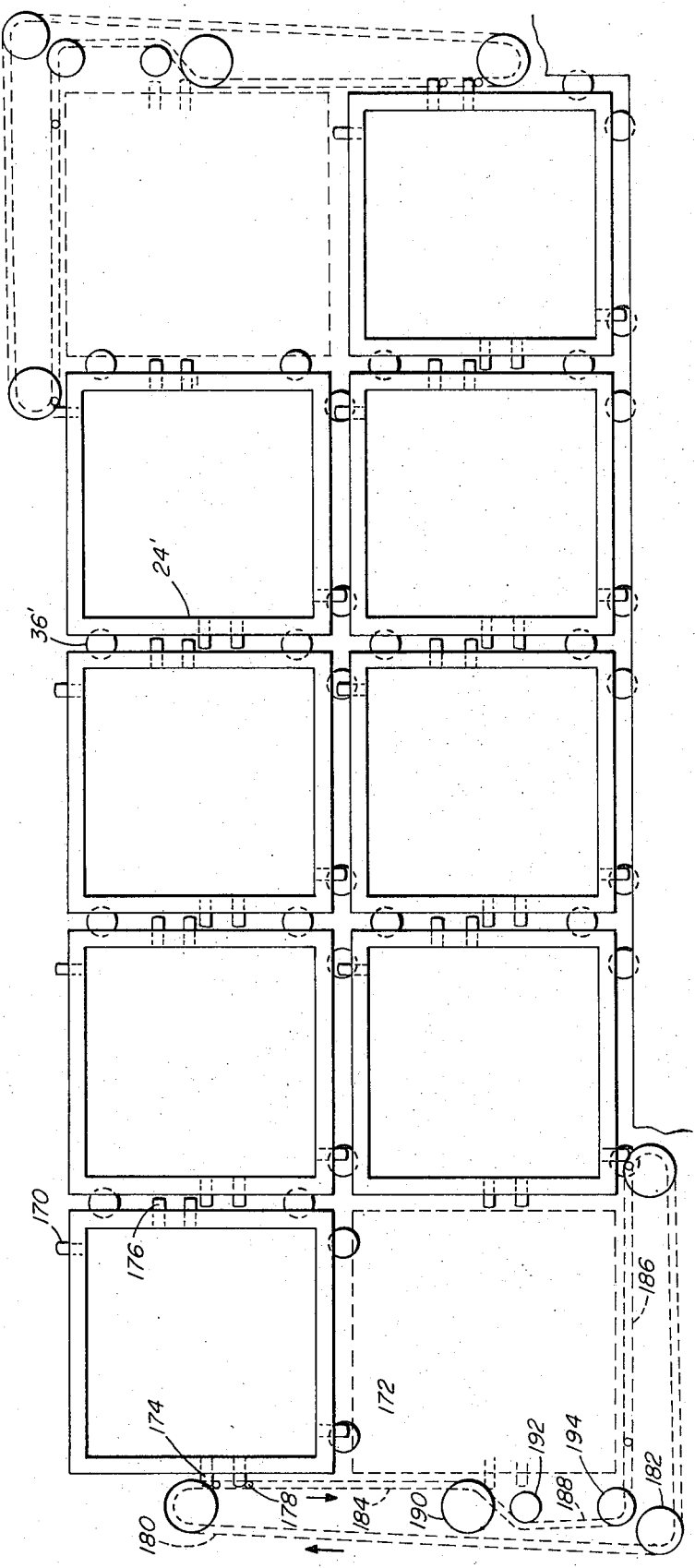

Referring now to FIG. 10 of the drawings, there is illustrated still another modification of the invention and, in this embodiment, each movable storage unit 24' is provided with rollers 36' as in the principal embodiment. In addition, each unit is equipped with fixed pins 170, 172, 174 and 176 extending, respectively, from the top, bottom and in pairs from the sides of each unit. These pins serve to drivingly engage coupling bars 178 carried by an endless chain 180 forming part of a transfer mechanism at opposite corners of the structure. Each mechanism includes a chain 180 and pulleys 182 at least some of which are sprocketed and one of which is driven. The pulley system each includes two reaches 184 and 186 where the bars 178 engage the pins 174 and 172, respectively, in the typical case of the lower left-hand system. Each system also includes an offset reach 188 formed by pullies 190, 192 and 194 where the bars disengage the pins 174, the storage unit 24' having reached its lowermost position. The opposite system operates in a similar fashion.

Having thus described the invention, what I claim and desire to obtain by Letters Patent of the United States is:

1. A storage system comprising
   a. a structure defining a rectangular volume,
   b. a plurality of matching individual rectangular storage units stacked in multiple columns within said volume,
   c. power-driven transfer means mounted to said structure and engageable with said units for raising, lowering and shifting said units within said volume,
   d. said structure and said units each being formed with cooperating guide means whereby a stack of units adjacent a vertical side of said structure will be guided on one side by said structure and on the opposite side by an adjacent stack of units and stacked units by each other,
   e. each of said transfer means including a lead screw extending parallel to the path of travel of said units, a nut threaded to said screw and relatively movable thereto and a latch mounted to one of said nut and screw for engagement with said units,
   f. one of said lead screws being mounted horizontally along the base of said structure for shifting the lowermost unit in a stack from one side to the other and an articulated telescopic arm mounted for pivotal movement at one end to a movable follower nut driven by said screw and at the opposite end being mounted for pivotal movement to a point substantially in the vertical plane of a side of said structure at a height generally corresponding to the height of one of said units whereby said arm will restrain stacked upper units while the lowermost unit is displaced to an adjacent stack.

2. A storage system according to claim 1 including resilient stop means mounted to the base of said structure below one of said stacks and proximate to said arm for cushioning the stacked units lowered by retraction of said arm.

* * * * *